United States Patent [19]

Agarwal et al.

[11] Patent Number: 4,807,134

[45] Date of Patent: Feb. 21, 1989

[54] DC TORQUE MOTOR ACTUATED ANTI-LOCK BRAKE CONTROLLER

[75] Inventors: Paul D. Agarwal, Troy; Alexander Kade, Grosse Pointe Woods, both of Mich.

[73] Assignee: General Motors Corporation, Detroit, Mich.

[21] Appl. No.: 71,434

[22] Filed: Jul. 9, 1987

[51] Int. Cl.$^4$ .............................................. B60T 8/58
[52] U.S. Cl. ........................... 364/426.02; 180/197; 303/100; 303/112
[58] Field of Search ................... 364/426; 180/197; 303/100, 104, 109–112

[56] References Cited

U.S. PATENT DOCUMENTS

| | | |
|---|---|---|
| 3,547,500 | 12/1970 | Riordan .............................. 303/104 |
| 3,663,069 | 5/1972 | Perry et al. ......................... 303/104 |
| 4,094,555 | 6/1978 | Byrne et al. ........................ 303/100 |
| 4,653,816 | 3/1987 | Lin ..................................... 303/109 |
| 4,664,453 | 5/1987 | Kade et al. .......................... 303/100 |
| 4,673,225 | 6/1987 | Kade .................................. 303/100 |
| 4,715,662 | 12/1987 | Van Zanten et al. ............... 303/100 |

Primary Examiner—Gary Chin
Attorney, Agent, or Firm—Howard N. Conkey

[57] ABSTRACT

A wheel lock control system is described for a wheel braking system that includes a motor driven actuator for applying controlled hydraulic brake pressure to the wheel brake that is determined by motor current. The motor current corresponding to the brake pressure producing the maximum possible braking effort during each brake pressure application is identified and a value related thereto is reapplied to the motor after an incipient wheel lockup condition is sensed.

3 Claims, 4 Drawing Sheets

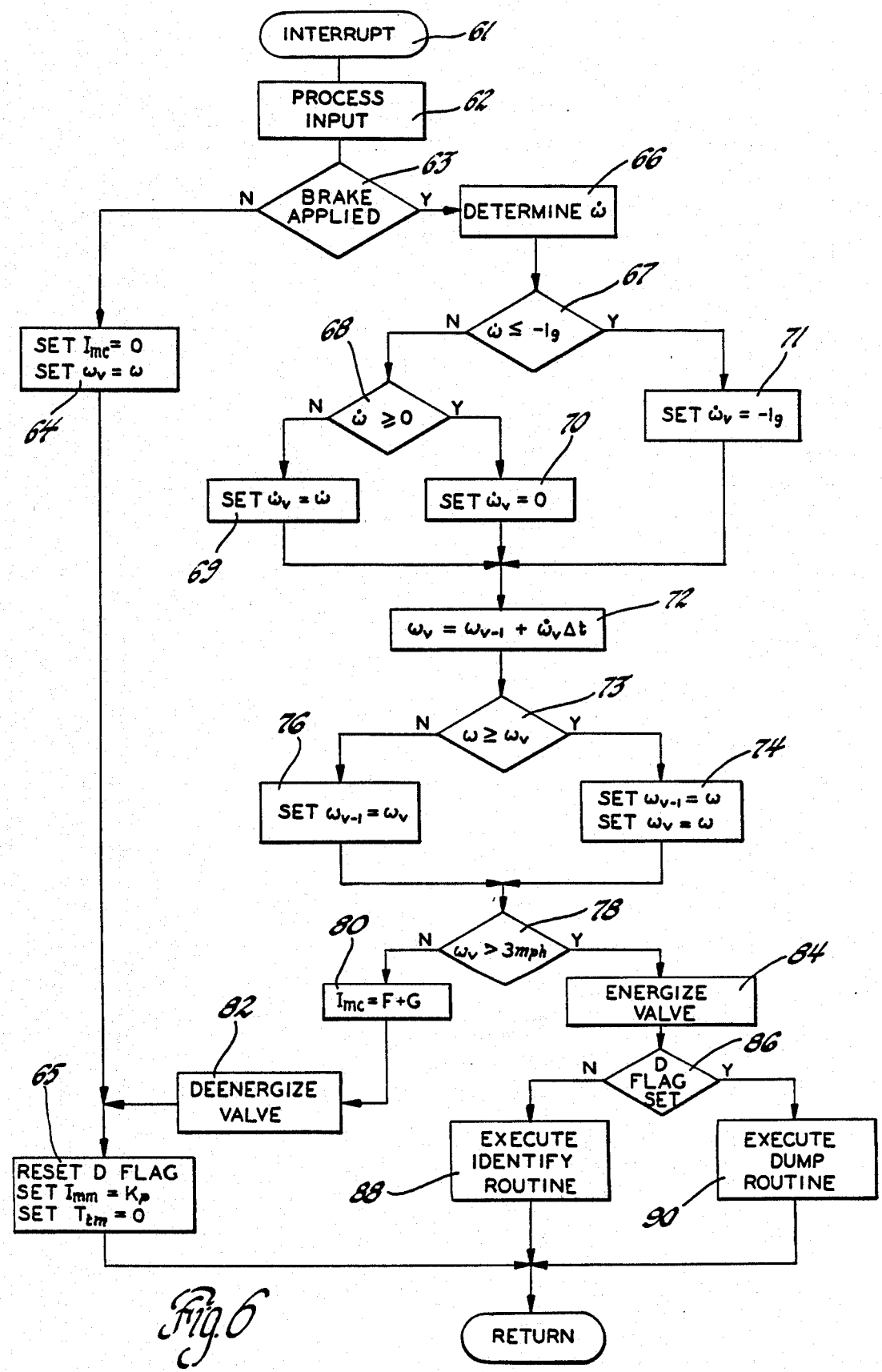

DC TORQUE MOTOR ACTUATED ANTI-LOCK BRAKE CONTROLLER

BACKGROUND OF THE INVENTION

This invention relates to an anti-lock control system for vehicle wheel brakes in which the actuator for establishing the braking pressure is provided by the operation of a DC torque motor and, particularly, such a system wherein the torque motor current is utilized for the measurement and control of the braking pressure.

When the brakes of a vehicle wheel are applied, a braking force between the wheel and the road surface is generated that is dependent upon various parameters including the road surface condition and the amount of slip between the wheel and the road surface. For a given road surface, the force between the wheel and the road surface increases with increasing slip values to a peak force occurring at a critical wheel slip value. As the value of wheel slip increases beyond the critical slip value, the force between the wheel and the road surface decreases. Stable braking results when the slip value is equal to or less than the critical slip value. However, when the slip value becomes greater than the critical slip value, braking becomes unstable resulting in sudden wheel lockup, reducing vehicle stopping distance and deterioration in the lateral stability of the vehicle.

Numerous wheel lock control systems have been proposed to prevent the wheels from locking while being braked. Typically, these systems prevent the wheels from locking by releasing the applied brake pressure when an incipient wheel lockup condition is sensed. After release of the brake pressure, the wheel recovers from the incipient wheel lockup condition after which brake pressure is re-applied. Various criteria have been used in order to determine when the brake pressure should be released and thereafter re-applied in order to maintain stable braking. For example, the values of wheel deceleration, acceleration and slip have been used in various systems to establish the times at which the brake pressure should be released and re-applied. Other systems have been proposed that also include measurements of the brake pressure actuator position and/or the brake pressure. Each of these systems require transducers for measuring the brake pressure and/or the position of the brake pressure actuator.

SUMMARY OF THE INVENTION

The subject invention is directed toward a form of wheel lock control system that includes a DC torque motor driven actuator for establishing the hydraulic brake pressure applied to the brake cylinders of a wheel brake. The brake pressure establishing the critical slip value and therefore the maximum braking force is identified when an incipient wheel lockup condition is detected and a brake pressure related to the identified brake pressure is re-established to thereby establish substantially the maximum possible braking force. Particularly, in this invention, the identified brake pressure establishing the maximum braking force and the re-establishment of a pressure related to this identified brake pressure is provided without the requirement of a pressure sensor for measuring the brake pressure nor the requirement of a position sensor monitoring the position of the torque motor driven actuator.

This invention utilizes the current of the torque motor as a measure of the brake pressure applied to the wheel brakes being controlled by the DC torque motor driven actuator. In general, the brake pressure established is a direct function of the torque output of the DC torque motor which in turn is a direct function of the torque motor current. This torque motor current is utilized in this invention for computing the tire torque tending to accelerate the wheel during braking and its value corresponding in time to the peak calculated tire torque stored. When an incipient wheel lockup condition is detected indicating that the critical wheel slip value establishing the peak braking force between the wheel and road surface has been exceeded, the stored motor current is the current that is representative of the brake pressure producing the peak tire torque and therefore the peak braking force. The motor current is then controlled based on this stored value of motor current to re-establish a brake pressure producing substantially the peak braking force for the existing road-tire interface condition.

In the foregoing manner, by utilizing the DC torque motor current for the measurement and application of brake pressure, the requirement for pressure transducers for measuring the pressure applied to the wheel brakes is eliminated thereby providing for a more economical brake controller.

DESCRIPTION OF THE DRAWINGS

The invention may be best understood by reference to the following description of a preferred embodiment and the drawings in which:

FIGS. 5 through 8 are diagrams illustrating the operation of the brake controller of FIG. 4.

DESCRIPTION OF THE PREFERRED EMBODIMENT

A wheel under the influence of braking has two major torques acting on it: brake torque and tire torque. Brake torque arises from the application of brake pressure through the brake mechanism and tire torque is generated by the friction of the tire-road interface as wheel slip occurs.

Brake torque $T_b$ is assumed to be proportional to brake pressure $P_b$ with a known brake gain $K_b$ and is defined by the expression $$T_b = P_b K_b. \tag{1}$$

Tire torque $T_t$ is related to the brake force coefficient $\mu$ between the tire and the road surface, the normal load $N$ on the tire and the wheel rolling radius $R$ and is defined by the expression $$T_t = \mu N R. \tag{2}$$

For the free body consisting of the brake, wheel, and tire, the equation of motion is $$I_W\dot{\omega}+T_b-T_t=0 \tag{3}$$

where $I_W$ is the wheel moment of inertia and $\dot{\omega}$ is the wheel angular acceleration. When the difference between the tire torque and the brake torque is positive, the wheel accelerates and when negative, the wheel decelerates. Combining expressions 1 and 3, tire torque $T_t$ is defined as $$T_t = I_W\dot{\omega} + P_b K_b. \tag{4}$$

Figure 1:
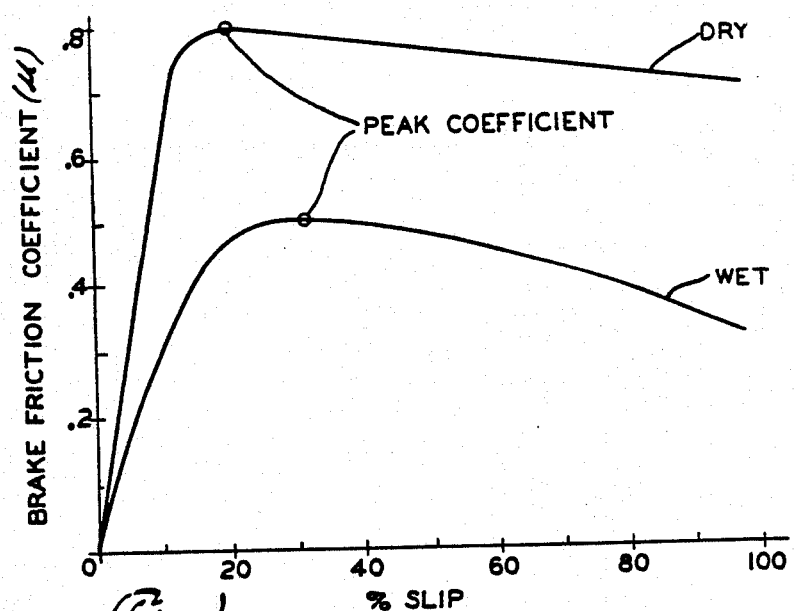
FIG. 1 is a diagram illustrating the brake force coefficient between a wheel and a road surface as a function of the percentage slip between the wheel and road surface for two road surface conditions.

The brake friction coefficient term $\mu$ of the tire torque is a non-linear function of the magnitude of slip between the wheel and the road surface during braking and is dependent upon the road surface condition. FIG. 1 illustrates the brake friction coefficient $\mu$ as a function of percentage wheel slip for two road surface conditions. For a given road surface, it can be seen that as wheel slip is increased in response to increased brake torque $T_b$, the brake friction coefficient $\mu$ and therefore the tire torque $T_t$ increases until a critical slip value at which the brake friction coefficient and the tire torque are at a maximum. A further increase in wheel slip results in a decrease in the tire torque due to a decrease in the brake friction coefficient and high wheel deceleration values. The maximum tire torque resulting in a maximum braking effort for a given road surface is achieved when the brake torque $T_b$ produces the critical wheel slip value. When the braking effort produces a wheel slip exceeding the critical slip value, the braking operation becomes unstable and typically results in sudden wheel lockup which in turn results in increased stopping distance and a deterioration in the steering and lateral stability of the vehicle.

Figure 2:
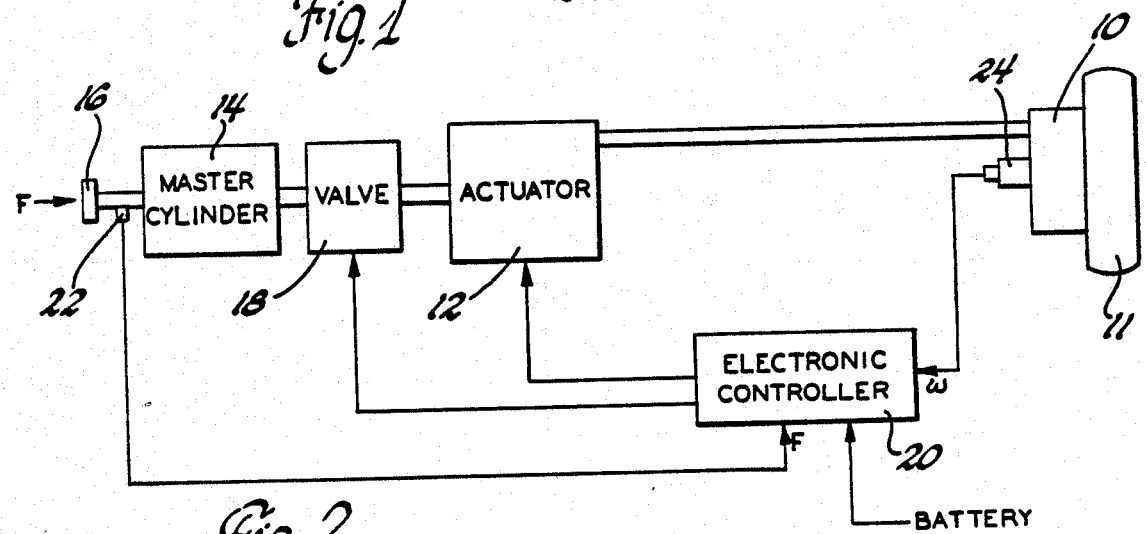
FIG. 2 is a general diagram of the braking system for controlling the brakes in accord with the principles of this invention.

A general overview of the wheel lock control system is illustrated in FIG. 2. The control of the brake of a single wheel is illustrated, it being understood that the control of the brakes of the remaining wheels of the vehicle are identical thereto. A standard wheel brake 10 for a wheel 11 is actuated by controlled hydraulic pressure from one of two sources. The primary source is a DC torque motor driven actuator 12 and the secondary source is a standard master cylinder 14 controlled directly by the vehicle brake pedal 16. A normally open electromagnetic valve 18 is energized when the actuator 12 is operative to control the hydraulic pressure to the brake 10 so as to decouple the master cylinder 14 and the brake pedal 16 from the hydraulic pressure output of the actuator 12. When the electromagnetic valve 18 is deenergized, the hydraulic pressure to the brake 10 may be modulated directly by the brake pedal 16 and the master cylinder 14.

The valve 18 is deenergized only during limited vehicle operating conditions such as during failed conditions of the primary hydraulic pressure source to permit brake pressure modulation by the master cylinder 14. At all other times, the valve 18 is energized to decouple the master cylinder 14 from the braking system.

An electronic controller 20 is responsive to the outputs of a brake pedal force sensor 22 providing a signal that is a measure of the operator applied brake pedal force F and a wheel speed sensor 24 that provides a signal that is a measure of wheel speed $\omega$. The electronic controller 20 is responsive to those signals to energize the valve 18 in the absence of a sensed failed condition of the primary hydraulic pressure source and control the hydraulic pressure applied to the wheel brake 10 via the motor controlled actuator 12.

Figure 3:
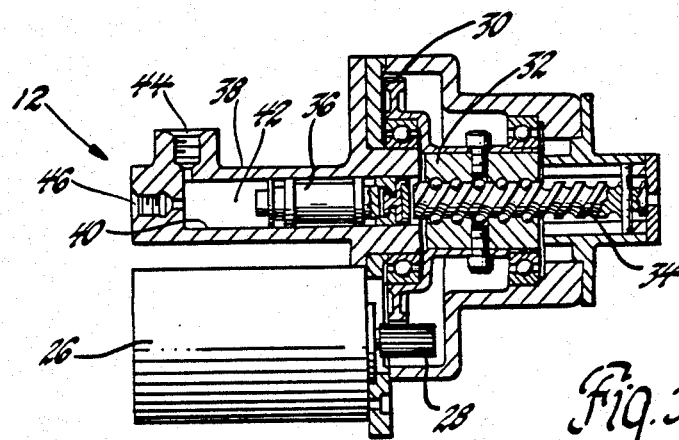
FIG. 3 is a longitudinal cross-sectional view of the actuator of FIG. 2 for modulating the brake pressure.

Referring to FIG. 3, the actuator 12 includes a DC torque motor 26 whose output shaft drives an input gear 28 which in turn rotatably drives an output gear 30. The drive member 32 of a ball screw actuator is secured for rotation with the output gear 30. The drive member 32 engages and axially positions the driven member 34 of the ball screw actuator. The driven member 34 drives a piston 36 to control the hydraulic pressure output of the actuator 12. In summary, the torque output of the motor 26 is translated into a directly related hydraulic pressure output of the actuator 12 that is applied to the respective brake of the vehicle wheels.

As more particularly illustrated in FIG. 3, the actuator 12 includes a housing 38 in which a cylinder 40 is formed. The piston 36 is reciprocally received in the cylinder 40 and defines therewith a chamber 42. The cylinder 40 has an inlet 44 operatively connected to the master cylinder 14 via the valve 18. The actuator 12 has an outlet 46 from the chamber 42 which is connected to the wheel brake 10.

When current is applied to the motor 26, the piston 36 is moved to apply brake pressure to the brake 10 until the hydraulic pressure acting on the piston 36 offsets the torque output of the motor 26 which is dependent (as will be described) upon the value of the motor current. The efficiency of the gears is high so that the motor output shaft is reverse driven by the hydraulic pressure acting on the piston 36 when it is greater than the torque output of the motor 26 until the hydraulic pressure is reduced to a level where it is overcome or offset by the torque output of the motor.

In general, the electronic controller 20 identifies the value of the brake pressure $P_b$ that corresponds in time to the maximum tire torque $T_t$. This is accomplished by continuously estimating the tire torque value $T_t$ of equation (4) during braking. Any time the estimated value is larger than any previous estimated value, the value of the tire torque and the braking pressure $P_b$ is stored so that the maximum tire torque and brake pressure corresponding in time therewith are known. When an incipient wheel lockup is detected, the brake pressure is dumped to allow the wheel speed to recover and the brake pressure is thereafter re-applied to the stored value to establish a braking condition in which the wheel slip is substantially at the critical slip value for the existing road surface condition. This results in substantially the maximum possible tire torque $T_t$ and the minimum stopping distance for the road surface condition.

In accord with this invention, the brake pressure utilized in equation (4) to establish the estimated value of tire torque $T_t$ and the brake pressure producing the peak value of tire torque are determined without the requirement of a pressure sensor but instead are determined based on the current of the DC torque motor 26 of FIG. 3.

The electromagnetic torque $T_m$ generated by the motor is $$T_m = K_T I_m \tag{5}$$

where $K_T$ is the torque constant of the motor and $I_m$ is the motor current. As previously indicated, the piston 36 will be positioned until the motor torque $T_m$ just overcomes the brake pressure. Therefore, the motor current $I_m$ is representative of the value of the brake pressure applied to the brake 10 from the actuator 12 and in accord with this invention is used as a measure thereof. Since the current $I_m$ has a value proportional to the brake pressure applied to the brake 10 from the actuator 12, it can be used as the brake pressure value of equation (4) in the estimation of the tire torque value. Substituting $I_m$ into equation (4) and letting $I_w$ equal $K_1$ yields the following equation for tire torque:

$$T_t = K_1 \dot{\omega} + K_2 I_m \qquad (6)$$

where $K_2$ is a known constant relating the motor current $I_m$ to the brake torque established by the corresponding brake pressure.

Figure 4:
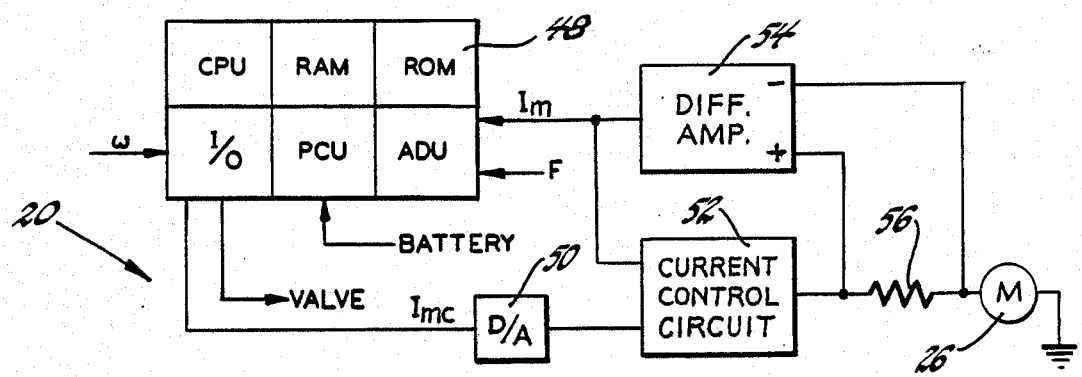
FIG. 4 is a diagram of the electronic controller of FIG. 1 for controlling the brake pressure to the wheel brakes.

The electronic controller 20 of FIG. 2 for controlling the DC torque motor 26 is illustrated in FIG. 4. The electronic controller 20 includes a digital computer 48 for controlling the torque motor 26 and the valve 18 in response to inputs including the signal F representing the operator commanded brake pressure, wheel speed $\omega$ and the current $I_m$ through the torque motor 26 according to an operating program permanently stored in a read only memory (ROM). The digital computer thus includes input/output circuitry (I/O) for receiving and outputting the various input and control signals, a central processing unit (CPU) for executing the control algorithm, an analog-to-digital unit (ADU) for converting analog input signals to digital signals, a random access memory (RAM) for temporary storage of information and a power control unit (PCU) receiving vehicle battery voltage and providing a regulated voltage to the various operating circuits. Design details of such circuits and devices are well known to those skilled in the art of electronic controls, and are therefore not presented herein.

The digital computer 48 provides one digital output to a digital-to-analog converter 50 representing a commanded motor current $I_{mc}$ to be applied to the motor 26 to establish a desired brake pressure. The analog signal output of the converter 50 representing the commanded current level is applied to a current control circuit 52 which compares the commanded motor current $I_{mc}$ with the actual motor current $I_m$ provided by a differential amplifier 54 monitoring the voltage across a motor current sensing resistor 56. The current control circuit 52 may include proportional and integral control circuits which provide for establishing a current through the motor 26 as sensed by the current sensing resistor 56 at the commanded level.

Figure 5:
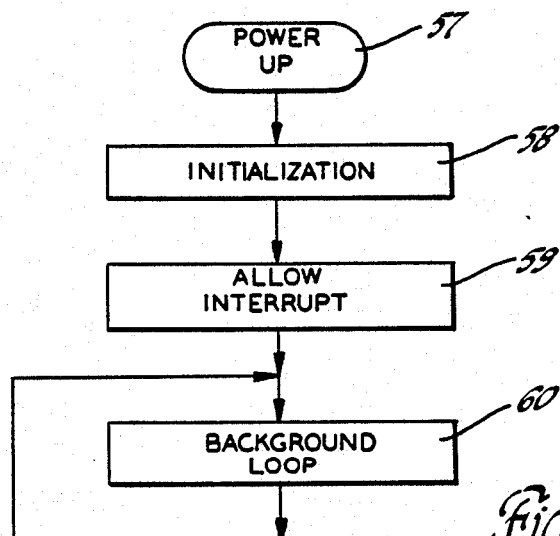

The operation of the electronic controller 20 in controlling the motor 26 to establish the braking pressure applied to the brake 10 of the wheel 11 is illustrated in the FIGS. 5-8. Referring first to FIG. 5, when power is first applied to the system such as when the vehicle ignition switch is rotated to its ON position, the computer program is initiated at point 57 and then proceeds to a step 58 where the computer 48 provides for system initialization. At this step, for example, initial value stored in a read only memory may be entered into random access memory locations and various counters, flags and timers may be initialized.

After the initialization step 58, the program proceeds to a step 59 where the program conditions the digital computer 48 to allow interrupts to occur and then to a background loop 60 which is continuously repeated. This loop may include, for example, diagnostic routines. In the preferred embodiment of this invention, an interrupt is provided by the digital computer 48 at 5 millisecond intervals. Following each interrupt, the execution of the background loop 60 is interrupted and the routines for controlling the actuator 12 so as to establish controlled hydraulic pressure to the brake 10 are executed.

Referring to FIG. 6, the 5 millisecond interrupt routine for controlling the vehicle brake 10 via the actuator 12 is illustrated. This routine is entered at point 61 and proceeds to a step 62 where the last determined value of wheel speed $\omega$ is saved and the various inputs to the digital computer including the signal F representing the force supplied to the brake pedal 16, the motor current $I_m$ and the wheel speed signal $\omega$ provided by the speed sensor 24 are processed and stored.

Next, the program proceeds to a step 63 where it is determined whether or not the operator is commanding brake application. The brakes are considered applied if the value of the brake pedal force F is greater than zero. If the brakes are not applied, the program proceeds to a step 64 where the motor current command value $I_{mc}$ is set equal to zero to establish a zero brake pressure command. Also at this step, the speed of the vehicle as represented by the speed $\omega_v$ of a hypothetical unbraked wheel is set equal to the wheel speed measured at step 62. Since the brakes are not applied, the wheel slip is substantially at zero so that the actual and hypothetical wheel speeds can be equated.

From step 64, the program proceeds to a step 65 where a D-flag is reset to condition the program to execute an identification routine (illustrated in FIG. 7) which identifies the motor current that establishes the brake pressure producing the critical wheel slip value and therefore the maximum possible braking effort and which provides for the application of brake pressure following the sensing of an incipient wheel lockup condition. As will be described, the D-flag is set when an incipient wheel lockup condition is sensed to condition the program to execute a dump routine (illustrated in FIG. 8) to release the brake pressure and allow the wheel speed to recover. Also at step 65, the motor current $I_{mm}$ establishing the maximum allow brake line pressure is set equal to a calibration constant $K_p$ and a RAM memory location storing the value of the maximum calculated tire torque value $T_{tm}$ is set equal to zero. Thereafter, the program exits the 5 millisecond interrupt routine and returns to the background loop 60 of FIG. 5.

The foregoing steps 62 thru 65 are continuously repeated at 5 millisecond intervals as long as the vehicle operator does not command brake application. However, when a force F is applied to the brake pedal, the program proceeds from step 63 to a series of steps that provide an estimation of the value of vehicle speed $\omega_v$ as represented by the speed of a hypothetical unbraked wheel. It is noted that the initial value of $\omega_v$ was set equal to the actual wheel speed $\dot{\omega}$ at step 64 prior to operation of the brake pedal 16. This series of steps begins at step 66 where the rate of change in wheel speed $\omega$ is determined from the old value of wheel speed saved at step 62 and the new value stored at step 62. The determined rate of change of wheel speed is then compared with a constant deceleration of 1g at step 67. The 1g deceleration value represents the maximum possible vehicle deceleration. When wheel deceleration is less than 1g, it is assumed that the vehicle is decelerating at the same rate as the wheel 11. If, however, the wheel deceleration exceeds 1g, it is assumed that the vehicle deceleration remains at the maximum value of 1g.

If the wheel deceleration is less than or equal to 1g, the program proceeds from step 67 to a step 68 where $\dot{\omega}$ is compared to zero. If the comparison indicates wheel deceleration, the program proceeds to step 69 where the rate of change of vehicle speed $\dot{\omega}_v$ is set equal to the actual measured rate of change of wheel speed. If, however, the comparison at step 68 indicates no change in wheel speed or wheel acceleration, the program proceeds to a step 70 where the rate of change of vehicle speed $\dot{\omega}_v$ is set equal to zero.

Returning to step 67, if it is determined that the wheel deceleration is 1g or greater, the program proceeds to a step 71 where is set equal to the maximum possible vehicle deceleration of 1g.

From the respective steps 69, 70 or 71, the program proceeds to a step 72 where vehicle speed $\omega_v$ is estimated. This estimation is based on an initial value of vehicle speed $\omega_{v-1}$ determined during the previous execution of the interrupt routine and the rate of change of vehicle speed determined at step 69, 70 or 71 over the five millisecond interval $\Delta t$ between interrupt periods.

From step 72, the program proceeds to step 73 where the actual wheel speed $\omega$ measured at step 62 is compared to the vehicle speed $\omega_v$ determined at step 72. If the wheel speed is equal to or greater than the vehicle speed (which cannot occur during braking of the wheel), the value of vehicle speed is corrected at step 74 by setting the vehicle speed $\omega_v$ equal to wheel speed $\omega$ and the initial vehicle speed $\omega_{v-1}$ to be used at step 72 in the next execution of the interrupt routine is set equal to wheel speed $\omega$. If at step 73 the wheel speed $\omega$ is determined to be less than the vehicle speed $\omega_v$, the program proceeds to a step 76 where the initial vehicle speed $\omega_{v-1}$ to be used at step 72 during the next execution of the interrupt routine set equal to the value of vehicle speed determined at step 72.

Following step 74 or step 76, the program proceeds to a step 78 where the vehicle speed is compared to a calibration constant such as 3 mph. If the vehicle speed is less than 3 mph, the program proceeds to a step 80 where the commanded motor current $I_{mc}$ is set equal to the value of the brake pedal force F times a gain constant G for providing power assisted braking. Thereafter, the program proceeds to a step 82 where the valve 18 of FIG. 2 is deenergized and then to the step 65 previously described.

If the vehicle speed is greater than 3 mph, the program proceeds from step 78 to step 84 where the valve 18 is energized to decouple the master cylinder 14 from the actuator 12. Brake application is thereafter provided solely via the actuator 12 as controlled by the electronic controller 20. From step 84, the program proceeds to a step 86 where the state of the D-flag is sampled. If the D-flag is reset to condition the program to execute the identify routine, the program proceeds to a step 88 where the identify routine is executed.

If step 86 determines that the D-flag is set, the program is conditioned to execute a dump routine, and the program proceeds to a step 90 where the dump routine is executed. During this routine, the pressure to the brake 10 is released to allow the speed of the wheel 11 to recover from an incipient lockup condition. Following the steps 88 or 90, the program exits the 5 millisecond interrupt routine of FIG. 6 and returns to the background loop 60 of FIG. 5.

Figure 7:
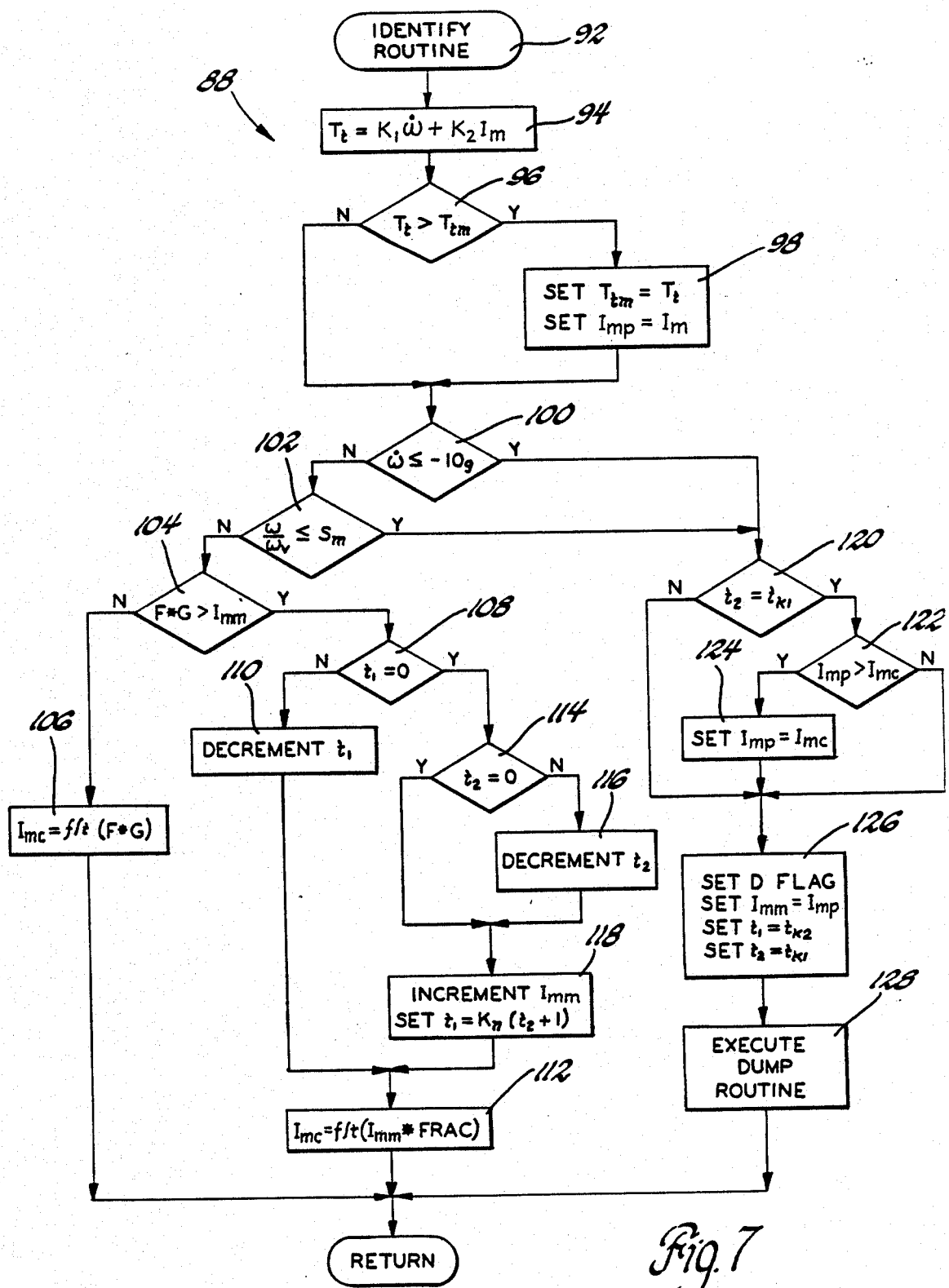

Referring to FIG. 7, the identify routine 88 of FIG. 6 is illustrated. This routine (A) provides for power assisted braking, (B) identifies the brake line pressure that produces the critical wheel slip corresponding to the maximum possible braking force between the tire and the road surface, (C) senses an incipient wheel lockup condition and conditions the program to execute the dump routine to allow wheel recovery from the lockup condition, (D) reestablishes the brake line pressure to a value related to the pressure producing the critical slip value.

The identify routine is entered at point 92 and proceeds to a step 94 where the value of the tire torque $T_t$ is calculated in accord with the equation (6) from the wheel deceleration $\dot{\omega}$ determined at step 66 and the motor current $I_m$ measured at step 62. From step 94, the program proceeds to steps 96 and 98 that function to identify the motor current representing the brake pressure producing the maximum value of tire torque. At step 96, the tire torque $T_t$ calculated at step 94 is compared with the largest previously calculated value $T_{tm}$ stored in memory. If the value calculated at step 94 is greater than the stored value $T_{tm}$, the program proceeds to a step 98 where the stored value $T_{tm}$ is set equal to the larger value calculated at step 94. Also at this step, a stored value of motor current $I_{mp}$ is set equal to the motor current measured at step 62. Therefore, the stored value $I_{mp}$ represents the motor current and therefore the brake line pressure corresponding in time to the maximum calculated value of tire torque stored at step 98.

The foregoing sequence of steps 96 and 98 are repeated with each execution of the identify routine as long as the tire torque is increasing so that the brake line pressure resulting in the maximum value of tire torque is always known. If step 96 should determine that the calculated value of tire torque $T_t$ is less than the stored maximum calculated value $T_{tm}$, step 98 is bypassed. This will occur when the brake pressure results in a wheel slip that exceeds the critical value which in turn results in a decrease in the tire torque. The stored value of motor current $I_{mp}$ then represents the brake line pressure establishing the critical wheel slip value and therefore the maximum braking effort. As will be described, this stored value of motor current is utilized after an incipient wheel lock condition is detected to reestablish a braking condition that produces substantially the critical wheel slip value.

The program next determines whether or not an incipient wheel lock condition exists as represented by excessive wheel deceleration or excessive wheel slip. At step 100, the rate of change in wheel speed determined at step 66 is compared with a deceleration reference value such as 10g which, if exceeded, indicates that braking has become unstable and an incipient wheel lockup condition exists. If step 100 does not detect an incipient wheel lockup condition, the program proceeds to step 102 where the ratio $\omega/\omega_v$ is compared with a reference value $S_m$ which represents a wheel slip value that exceeds the largest possible critical wheel slip value for any road surface condition. A ratio less than $S_m$ indicates that braking has become unstable and an incipient wheel lockup condition exists.

If neither of the steps 100 and 102 detects an incipient wheel lockup condition, the program proceeds to a step 104 where the value of the operator requested brake pressure that is equal to the applied pedal force F times the power assist gain factor G is compared with a maximum allowable brake line pressure represented by the motor current value $I_{mm}$. If the product is less than the maximum value, the program proceeds to a step 106 where the commanded motor current $I_{mc}$ is adjusted toward the operator requested value in accord with a first order lag filter equation to provide power assisted braking. Thereafter, the program exits the identify routine and returns to the background loop 60.

If at step 104 it is determined that the operator requested brake pressure is greater than the maximum allowable represented by the motor current value $I_{mm}$, the program proceeds to a pressure ramp routine where, through repeated executions of the identify routine, the maximum allowable motor current $I_{mm}$ and the commanded motor current $I_{mc}$ are ramped up until step 104 detects that the maximum allowable motor current has become greater than the operator requested motor current or, if the operator requested motor current results in an unstable braking condition, until the commanded motor current results in an incipient wheel lockup condition at which time the motor current representing the brake pressure establishing the critical slip value has been identified by the steps 96 and 98. As will be described, the motor current so identified is then used to reestablish the brake pressure after the wheel recovers from the incipient lockup condition. The result of the ramping of the motor current is a periodic low frequency re-identification of the brake pressure producing the critical wheel slip value. This enables the system to adapt to increasing values of the brake friction coefficient resulting from changes in the tire-road surface interface.

The routine for ramping the motor begins at a step 108 where the value of a time $t_1$ in a RAM timing register is compared to zero. The initial value of time $t_1$ establishes a delay in the ramping of the commanded motor current $I_{mc}$. Thereafter, the time $t_1$ functions in establishing the ramp rate. If the time $t_1$ is greater than zero, the program proceeds to a step 110 where the time $t_1$ is decremented. Thereafter, at step 112, the program proceeds to adjust the commanded motor current $I_{mc}$ toward a predetermined fraction of the maximum allowable value $I_{mm}$ in accord with a first order lag filter equation. By setting the maximum allowable motor current $I_{mm}$ to the stored motor current $I_{mp}$ after an incipient wheel lockup condition is sensed (as will be described), the brake pressure resulting from the commanded current established at step 112 will be the predetermined fraction of the pressure producing the critical wheel slip. In one embodiment, the predetermined fraction is 0.9 so that the resultant brake pressure produces substantially the critical wheel slip value.

As long as an incipient wheel lock condition is not detected and the operator requested brake pressure is greater than the maximum allowable brake line pressure represented by the motor current $I_{mm}$, the steps 108 thru 112 are repeated at the five millisecond interrupt interval until $t_1$ has been decremented to zero. After $t_1$ has been decremented to zero, the program proceeds from step 108 to step 114 where the time $t_2$ in a RAM timing register is compared to zero. If the time $t_2$ is greater than zero, the program proceeds to a step 116 where the time $t_2$ is decremented.

Following step 116 or step 114, the program proceeds to a step 118 where the maximum allowable motor current $I_{mm}$ is incremented and the time $t_1$ is set equal to $K_n(t_2+1)$. Thereafter, the steps 114 thru 118 will be bypassed upon repeated executions of the identify routine until $t_1$ is again decremented to zero. From this it can be seen that the maximum allowable motor current $I_{mm}$ is periodically incremented at intervals determined by $K_n$ and $t_2$. When $t_2$ is decremented to zero, the maximum allowable motor current $I_{mm}$ is incremented with each $K_n$ executions of the identify routine.

Following step 118, the program proceeds to step 112 where the commanded motor current is again set as previously described. Repeated executions of the foregoing steps function to increase the commanded motor current exponentially. This increase will be continued until (A) an incipient wheel lock condition is forced so as to force a reidentification of the brake pressure producing the critical slip value via the steps 96 and 98 or (B) the operator requested motor current becomes less than the maximum allowable motor current $I_{mm}$.

If the commanded motor current $I_{mc}$ is increased to a point resulting in the wheel slip value becoming greater than the critical slip value, the wheels then quickly approach a lockup condition. This incipient wheel lock condition is detected as previously described at step 100 or step 102. When the incipient wheel lockup condition is detected, the motor current $I_{mp}$ in memory at that time is the motor current establishing the brake line pressure producing the critical wheel slip value and therefore the maximum possible tire torque.

After a wheel lockup condition has been sensed, the program proceeds to a step 120 where the time $t_2$ is compared with a constant $t_{k1}$. As will be seen, these two values will be equal only if a wheel lockup condition is sensed within a predetermined time $t_{k2}$ (such as 500 ms) after the brake pressure is reestablished after recovery from an incipient wheel lockup condition. A wheel lockup occurring within this period after reapplication of the brake pressure implies the application of an unstable brake pressure producing an incipient wheel lockup condition. If this condition exists, the program proceeds to a step 122 where the motor current $I_{mp}$, stored at step 98 and identified as the current representing the pressure establishing the critical wheel slip value, is compared with the commanded motor current $I_{mc}$ which resulted in the incipient wheel lockup condition. If greater, the program proceeds to a step 124 where the stored value of $I_{mp}$ is corrected to the commanded pressure $I_{mc}$. This condition represents an error in the calculation of the tire torque either through changes in the brake line coefficients or errors in various constants used in the determination of the calculation of the tire torque $T_t$. Since the motor current establishing the brake line pressure producing the critical slip value can never be greater than the commanded motor current $I_{mc}$ that resulted in an incipient wheel lock condition, the value of $I_{mp}$ is reduced to the value of $I_{mc}$ causing the incipient wheel lock condition.

From step 120 if the time $t_2$ is not equal to $t_{k1}$, from step 122 if $I_{mp}$ is less than $I_{mc}$, or from step 124, the program proceeds to a step 126 where the D-flag is set to condition the program to execute the dump routine and certain initial conditions for reapplication of brake pressure are established. The initial conditions include setting the maximum allowable motor current $I_{mm}$ equal to the stored value of motor current $I_{mp}$ (the motor current identified as producing the critical wheel slip value), setting the time $t_1$ equal to the constant $t_{k2}$ and setting the time $t_2$ equal to the constant $t_{k1}$. The program next proceeds to a step 128 where the dump routine is executed. Thereafter, during executions of the 5 ms interrupt routine of FIG. 6, the identify routine is bypassed via the step 86 and the dump routine 90 is executed until the D-flag is again reset.

Figure 8:
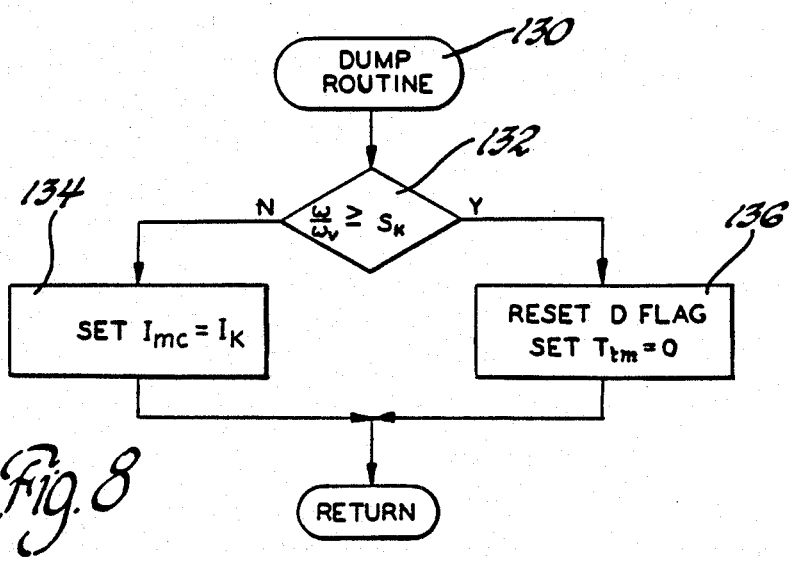

The dump routine executed at step 128 of the identify routine of FIG. 7 and at step 90 of the interrupt routine of FIG. 6 is illustrated in FIG. 8. This routine is entered at point 130 and proceeds to step 132 where wheel slip represented by the ratio of wheel speed $\omega$ to the speed $\omega_v$ of the hypothetical unbraked wheel is compared to a constant $S_k$ representing wheel speed approaching vehicle speed. $S_k$ may be, for example, 0.9 representing a wheel slip of 10 percent. If the ratio is less than $S_k$, the program proceeds to a step 134 where the commanded motor current $I_{mc}$ is set to some low value $I_k$ or zero to allow the wheel speed to recover from the incipient wheel lockup and toward vehicle speed. When step 132 detects wheel speed recovery, the program proceeds from step 132 to a step 136 where the D-flag is reset to condition the program to execute the identify routine of FIG. 7. Also at this step, the maximum value of calculated tire torque $T_{tm}$ is set to zero so that the identify routine is conditioned to re-identify the motor current at which the brake pressure establishes the critical wheel slip value. The program then exits the dump routine of FIG. 8 and returns to the background loop 48.

During the following executions of the 5 millisecond interrupt routine of FIG. 6, the program executes the identify routine at step 88 until the D-flag is again set at step 126 after an incipient wheel lockup condition is sensed.

A brief summary of operation will now be described. At step 65 prior to the operator applying the vehicle brakes and at step 136 prior to brake pressure being reapplied after being released by the dump routine of FIG. 8, the stored maximum value $T_{tm}$ of calculated tire torque is set to zero so that prior to each application of brake pressure, the identify routine is conditioned to identify the brake pressure corresponding in time to the maximum calculated tire torque $T_{tm}$.

As the commanded motor current $I_{mc}$ is increased via steps 104 and 106 or ramped up via the steps 104 and steps 108 through 118, the stored motor current value $I_{mp}$ is continually updated with each increasing calculated value of tire torque.

When an incipient wheel lockup condition is sensed at step 100 or 102, the brake pressure represented by the stored value of $I_{mp}$ is the brake pressure that resulted in the wheel slip being at the critical value and which produced the maximum possible braking effort for the existing tire-road interface condition. The maximum allowable motor current $I_{mm}$ is set equal to the value of $I_{mp}$ at step 126.

The D-flag is then set at step 126 after which the dump routine of FIG. 8 is repeated during each 5 ms interrupt to release the brake pressure to allow the wheel speed to recover. When the wheel speed has recovered, the D-flag is reset at step 136 so that the identify routine is then executed during each 5 ms interrupt. When executed, the identify routine reapplies the brake pressure at step 112 to the predetermined fraction of the maximum allowable brake pressure represented by $I_{mm}$. Recalling that $I_{mm}$ was set equal to the value $I_{mp}$ that established the critical wheel slip value, the brake pressure reapplied is the predetermined fraction of the pressure establishing the critical wheel slip value. Since the fraction is typically large, such as 0.9, the brake pressure reapplied results in stable braking while at a wheel slip value substantially equal to the critical wheel slip value. After the time $t_{k2}$ (the initial value of $t_1$ set at step 126) which is typically 500 ms, the brake pressure is slowly ramped until an incipient wheel lock condition is again detected. While the brake pressure is being reapplied and thereafter ramped, the steps 96 and 98 are functioning to reidentify and store the brake pressure represented by motor current producing the critical wheel slip value.

The foregoing cycle is continually repeated as long as the operator requested pressure is greater than the maximum allowable pressure $P_m$.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in hich an exclusive property or privilege is claimed are defined as follows:

1. A wheel lock control system for limiting the brake pressure applied to the brake of a vehicle wheel traveling over a road surface, the system comprising:
    an actuator for controlling the brake pressure to the brake of the wheel, the actuator including a torque motor for generating a motor torque in response to motor current to control the applied brake pressure in accordance with the value of the motor torque, the motor torque having a value proportional to the value of the motor current;
    means for determining the tire torque tending to accelerate the wheel during the application of brake pressure;
    means for storing the value of motor current corresponding to the maximum determined value of tire torque;
    means for detecting an incipient wheel lockup condition; and
    means for establishing the motor current following a detected incipient wheel lockup condition at a value having a predetermined relationship to the stored value of motor current to control the brake pressure at a predetermined braking condition.

2. A wheel lock control system for limiting the brake pressure applied to the brake of a vehicle wheel traveling over a road surface, the system comprising:
    an actuator for controlling the brake pressure to the brake of the wheel, the actuator including a torque motor for generating a motor torque in response to motor current to control the applied brake pressure in accordance with the value of the motor torque, the motor torque having a value proportional to the value of the motor current;
    means for determining the tire torque tending to accelerate the wheel during the application of brake pressure;
    means for storing the value of motor current corresponding to the maximum determined value of tire torque during periods of application of brake pressure;
    means for detecting an incipient wheel lockup condition;
    means for decreasing the motor current in response to a detected incipient wheel lockup condition to allow wheel speed recovery; and
    means for reestablishing the motor current following wheel speed recovery to a value having a predetermined relationship to the stored value of motor current.

3. A wheel lock control system for limiting the brake pressure applied to the brake of a vehicle wheel traveling over a road surface, the system comprising:
    an actuator for controlling the brake pressure to the brake of the wheel, the actuator including a torque motor for generating a motor torque in response to motor current to control the applied brake pressure in accordance with the value of the motor torque, the motor torque having a value proportional to the value of the motor current;

means for determining the tire torque tending to accelerate the wheel during the application of brake pressure;

means for storing the value of motor current corresponding to the maximum determined value of tire torque during the application of brake pressure;

means for detecting an incipient wheel lockup condition; and means for establishing the motor current following a detected incipient wheel lockup condition to a value that is a predetermined fraction of the stored value of motor current to control the brake pressure which establishes substantially the maximum possible braking force.

* * * * *